US010462292B1

(12) United States Patent
Stephens

(10) Patent No.: US 10,462,292 B1
(45) Date of Patent: *Oct. 29, 2019

(54) ANTI-SPOOFING TECHNIQUES FOR OUTBOUND TELEPHONE CALLS

(71) Applicant: Republic Wireless, Inc., Raleigh, NC (US)

(72) Inventor: Gregory Stephens, Cary, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,276

(22) Filed: Jun. 26, 2019

Related U.S. Application Data

(63) Continuation of application No. 16/384,385, filed on Apr. 15, 2019, now Pat. No. 10,375,238.

(51) Int. Cl.
| | | |
|---|---|---|
| *H04M 3/42* | (2006.01) | |
| *H04M 3/436* | (2006.01) | |
| *H04M 7/00* | (2006.01) | |

(52) U.S. Cl.
CPC ....... *H04M 3/436* (2013.01); *H04M 3/42059* (2013.01); *H04M 7/0078* (2013.01)

(58) Field of Classification Search
CPC ............. H04M 3/42056; H04M 3/436; H04M 3/4365; H04M 3/00; H04M 3/42; H04M 3/46; H04M 3/4872; H04M 3/5158; H04M 7/0078
USPC ............ 379/142.01, 142.04, 142.05, 220.01, 379/220.05, 245, 221.05
See application file for complete search history.

(56) References Cited

U.S. PATENT DOCUMENTS

| | | | | |
|---|---|---|---|---|
| 7,653,188 | B2* | 1/2010 | Kloberdans | H04L 63/14 370/356 |
| 9,001,985 | B2* | 4/2015 | Cox | H04M 15/06 379/114.14 |
| 10,146,919 | B1* | 12/2018 | Osborne | G06N 20/00 |
| 2011/0281567 | A1* | 11/2011 | Moliner | H04W 4/14 455/414.3 |
| 2019/0158663 | A1* | 5/2019 | Dowlatkhah | H04M 3/436 |

* cited by examiner

*Primary Examiner* — Binh Kien Tieu
(74) *Attorney, Agent, or Firm* — Gregory Stephens

(57) ABSTRACT

Techniques are disclosed for verifying a caller ID field of an outbound telephone call. A termination service provider call server receives a call request from a calling endpoint. The call request includes a called endpoint telephone number, and a caller ID telephone number. The call request is forwarded to an inbound carrier call server servicing the called endpoint telephone number where it determines the termination service provider for the caller ID telephone number and sends a query back to the determined termination service provider to determine whether the caller ID telephone number is currently in use. The query includes the caller ID telephone number. The termination service provider call server determines whether the caller ID telephone number in the received query is currently in use. If the caller ID telephone number is not currently in use, it returns a fail message to the inbound carrier call server. If the caller ID telephone number is currently in use, it returns a pass message to the inbound carrier call server only if the caller ID telephone number has been currently in use for less than a predetermined time.

12 Claims, 4 Drawing Sheets

100

200

300

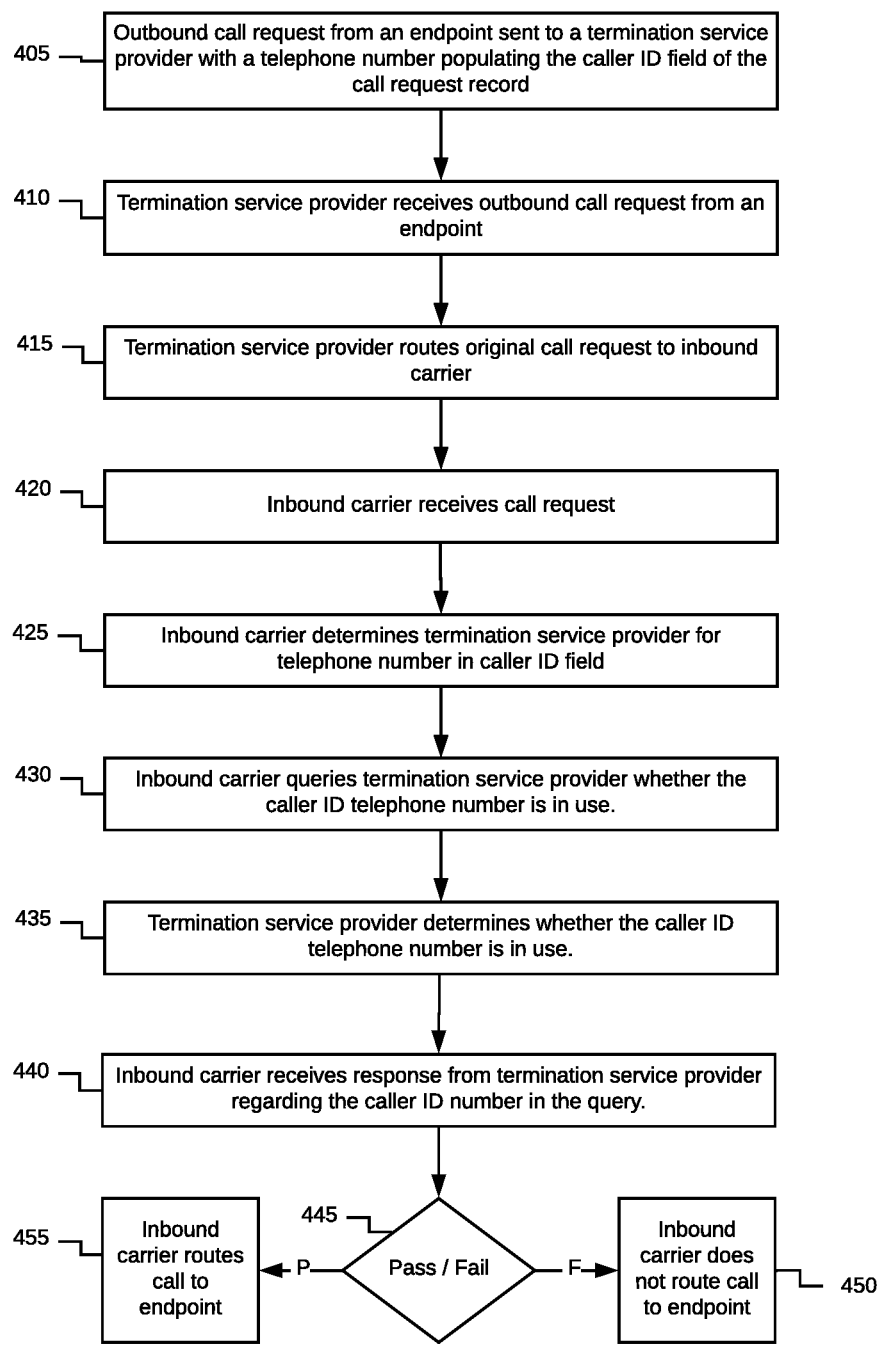

ANTI-SPOOFING TECHNIQUES FOR OUTBOUND TELEPHONE CALLS

CROSS REFERENCE TO RELATED APPLICATIONS

This application is a continuation of and claims priority to U.S. Ser. No. 16/384,385 filed on Apr. 15, 2019 and entitled, "Anti-Spoofing Techniques for Outbound Telephone Calls".

TECHNICAL FIELD

Examples described herein are generally related to techniques for verifying the caller ID field of an outbound telephone call.

BACKGROUND

One of the most vexing issues in telecommunications today is the proliferation of unwanted telephone calls. Most unwanted telephone calls are unsolicited attempts to sell goods or services. Oftentimes, a computerized calling program is utilized to place thousands of calls. This practice has been dubbed "robocalling" and is the subject of numerous complaints to government agencies like the Federal Communications Commission (FCC).

Those that employ robocalling have gotten more sophisticated in their approaches mainly through the use of caller ID spoofing. Caller ID is the mechanism employed by virtually every telephony service provider that identifies the telephone number of the calling party to the called party. The intent is to provide the called party with knowledge of who is calling when deciding whether to answer the call. Spoofing refers to the practice of altering the caller ID field of an outbound call to mask the true identity of the calling party. Typically, the robocaller will alter the area code and perhaps the local exchange portion of the calling telephone number to make the calling party appear to be a local call. Anecdotally, people are more likely to answer a telephone call from the same area code than from a distant area code. Any changes to the caller ID field mask the true identity of the calling party and deceive the called party. It may be argued that if a called party could actually trust the caller ID on an inbound call, they could more effectively screen their calls answering only the ones they were most confident were not unsolicited robocalls.

What is needed are techniques for verifying the caller ID field of an outbound telephone call is indeed the telephone number associated with the calling party.

BRIEF DESCRIPTION OF THE DRAWINGS

FIG. 4 is another logic flow diagram describing a process for verifying the caller ID field of an outbound telephone call according to an embodiment of the invention.

DETAILED DESCRIPTION

The embodiments described herein disclose systems, methods, and computer program products for verifying the caller ID field of an outbound telephone call. The systems and methods of the invention may be embodied in and performed by network based communication server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access over a wide ranging spectrum of bandwidth.

Figure 1:
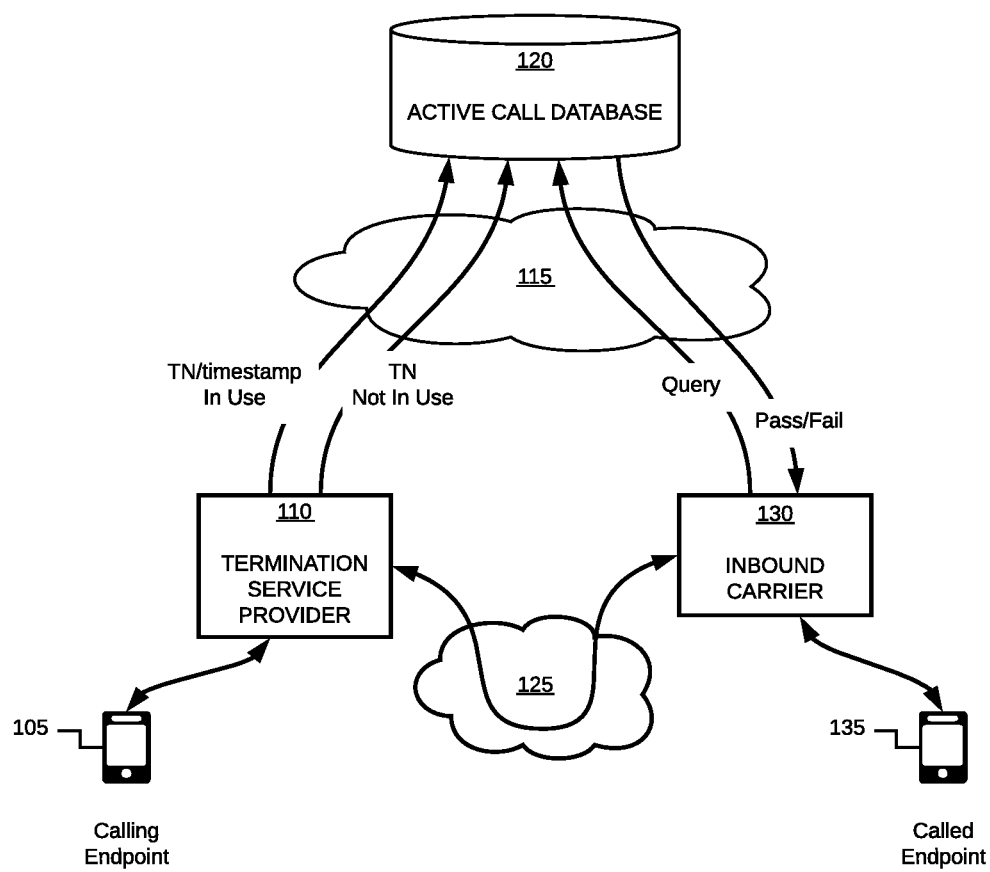
FIG. 1 illustrates a system architecture according to an embodiment of the invention.

FIG. 1 illustrates a system architecture 100 according to an embodiment of the invention. FIG. 1 traces an outbound call from a calling endpoint 105 to the outbound carrier 110 through one or more first networks 125 over to an inbound carrier 130 and finally to the called endpoint 135. Along the way, the outbound carrier 110 notifies an active call database 120 via a second network 115 of the call attempt. The phrase "outbound carrier" refers to the entity that provides outbound calling services for specific telephone numbers. This may be referred to as the "termination service provider" or "term provider". Thus, the phrase outbound carrier includes and is meant to refer to the entity that provides termination service for one or more telephone numbers. The termination service provider is not necessarily the owner of the telephone number. It is fairly common in the telephony industry for a customer to acquire telephone numbers from a first carrier but utilize a second service provider for termination (outbound calling) services for those telephone numbers.

The calling and called endpoints 105, 135 may be landline telephones, VoIP telephones, mobile telephones, computer softphones, or the like. Each endpoint may be associated with a telephone number maintained by the telephony carrier that services the endpoint. The telephony carrier may be either the outbound carrier or the inbound carrier depending on the which endpoint the telephony carrier services. In some cases, the telephony carrier may be both the outbound carrier and the inbound carrier if the calling and called endpoints 105, 135 are both serviced by the same telephony carrier.

Each time a call is attempted, the calling endpoint 105 dials the number of the called endpoint 135. The caller ID field for the call record is normally populated with the telephone number associated with the calling endpoint 105. The termination service provider 110 serving the calling endpoint 105 receives and processes the call request. Just prior to normal call processing, the termination service provider 110 creates an "in use" message that includes the telephone number of the calling endpoint 105 and a timestamp. The "in use" message is then sent to the active call database 120. The purpose of the active call database 120 is to keep track of all calling endpoint telephone numbers currently in use and exactly when they went in use.

The termination service provider 110 will then forward the call request to the inbound carrier 130 providing service to the called endpoint telephone number by way of one or more first networks 115. The inbound carrier 130 receives the call request that includes a telephone number in the caller ID field that is supposed to properly identify the calling endpoint. Before forwarding the call request to the called endpoint, the inbound carrier 130 can verify the caller ID telephone number does indeed correspond to the calling endpoint 105 attempting to place the call. Verification may comprise the inbound carrier 130 sending a query message to the active call database 120. The query may simply include the telephone number obtained from the caller ID field of the call request. There are two possible query results that cover three states. One query result is that the telephone number provided in the query is not in use as determined by the active call database 120 leading to a response back to the inbound carrier 130 of "fail". This may occur If the number has been altered or "spoofed" in the call request.

Another possible result is that the query determines the telephone number provided in the query is in use. That is not dispositive, however, as the telephone number may have already been in use prior to the call request being made. Thus, all "in use" query results are checked against the timestamp in the original "in use" message from the termination service provider 110 to determine how long the telephone number has been in use. If the telephone number has been in use for more than a couple seconds prior to the query from the inbound carrier 130 it likely means the telephone number is in use because of a different call request than the one currently at issue. This may occur if the robocaller has spoofed a number that is currently on another call. So, while the query result may come back "in use" the response back to the inbound carrier 130 may be "fail" because of the timing mismatch.

If the active call database 120 timestamp check determines the inbound carrier 130 query was received immediately after the "in use" message sent by the termination service provider 110, the query result back to the inbound carrier 130 will be "pass". If the query result is "pass" then, and only then, will the inbound carrier 130 forward the call request to the called endpoint 135.

Figure 2:
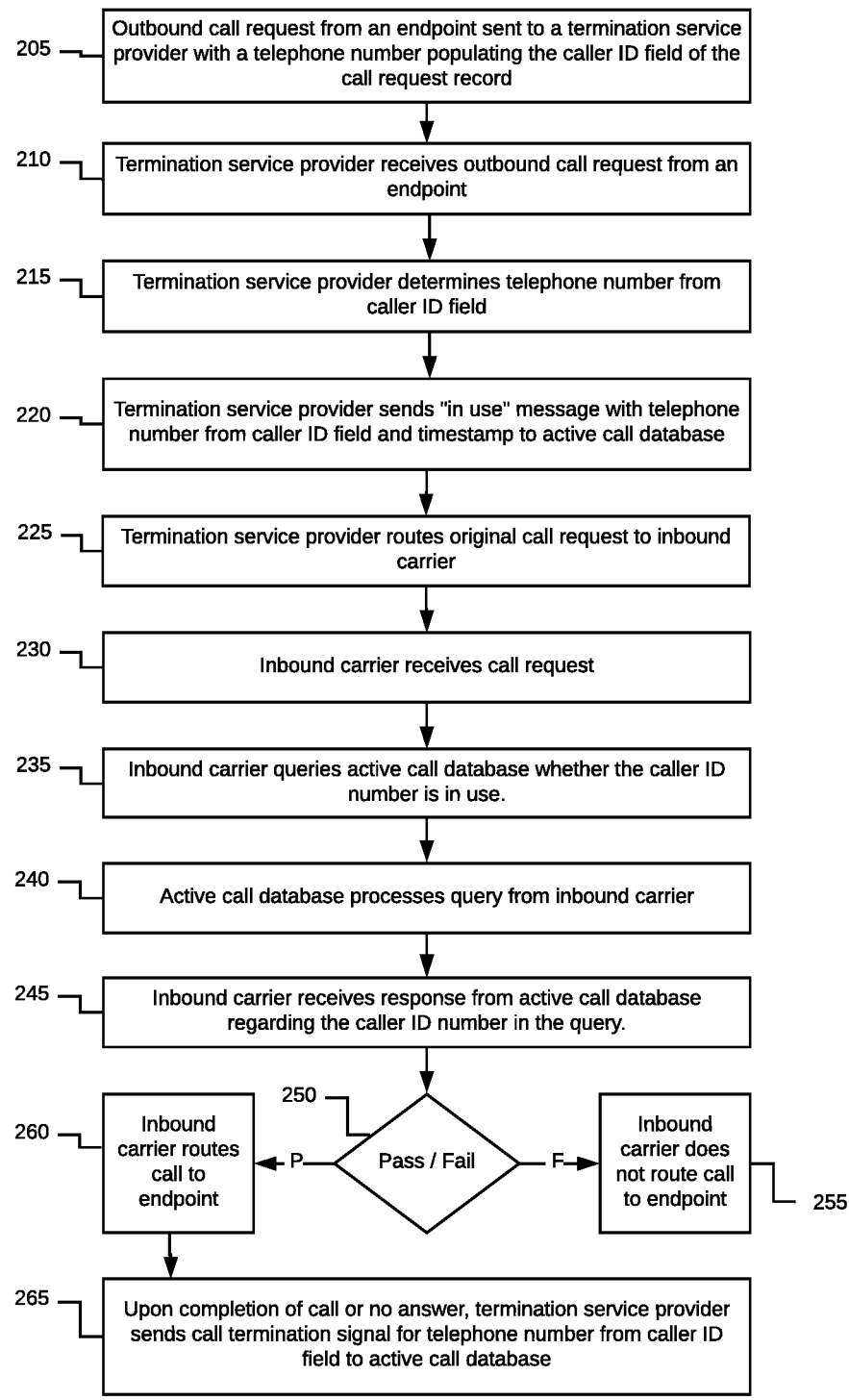
FIG. 2 is a logic flow diagram describing a process for verifying the caller ID field of an outbound telephone call according to an embodiment of the invention.

FIG. 2 illustrates an example logic flow diagram according to an embodiment of the invention. The logic flow may be representative of some or all of the operations executed by one or more embodiments described herein. Further, the logic flow may performed by circuitry and one or more components discussed herein. Moreover, the logic flow may be performed in conjunction with one or more other logic flows discussed herein and lists particular steps occurring in a particular order. However, embodiments are not limited in this manner and any step may occur in any order. Further, steps of the logic flows may not be dependent upon one another and as such particular steps in the logic flows may not occur. Specifically, FIG. 2 is a logic flow diagram describing a process 200 of verifying the caller ID field of an outbound telephone call is indeed the telephone number associated with the calling party according to an embodiment of the invention.

The verification process begins when an outbound call request from a calling endpoint 105 is sent to the outbound carrier servicing that calling endpoint 105 at step 205. The outbound call request includes the telephone number of the called endpoint 135 and the telephone number of the calling endpoint 105 embedded in the caller ID field of the call request.

The termination service provider 110 receives the call request from the calling endpoint 105 at step 210 and determines the telephone number in the Caller ID field at step 215. Prior to routing the call request to the appropriate inbound carrier 130, the termination service provider 110 creates an "in use" message comprised of the telephone number from the caller ID field and a timestamp (e.g., hh:mm:ss.ss—down to hundredths of a second). The termination service provider 110 then sends the "in use" message to the active call database 120 at step 220 where it is stored. The termination service provider 110 then routes the original call request to the appropriate inbound carrier 130 based on the called endpoint telephone number in the call request.

The inbound carrier 130 receives the call request at step 230. Prior to routing the call request to the called endpoint 135, the inbound carrier first sends a query to the active call database at step 235. The purpose of the query is to determine if the telephone number in the caller ID field of the call request is currently in use. Therefore, the query includes the telephone number copied from the caller ID field of the call request. The active call database 120 immediately processes the query at step 240 and checks its records for an entry corresponding to the telephone number in the query.

If the telephone number is not currently in the active call database, a response message containing the flag "fail" is prepared and returned to the inbound carrier 130. If the telephone number is currently in the active call database, the active call database then compares the timestamp associated with the telephone number. If the timestamp for the telephone number is outside a threshold duration with the timestamp of the inbound carrier query, the result is also a "fail". A response message containing the flag "fail" is prepared and returned to the inbound carrier 130. However, if the timestamp for the telephone number is within the threshold duration with the timestamp of the inbound carrier query, the result is deemed a "pass". A response message containing the flag "pass" is prepared and returned to the inbound carrier 130. The duration between the timestamp of the inbound carrier query and the timestamp of the inbound carrier query may be chosen to accurately correlate the original call request with the inbound carrier query. For instance, if the timestamps are too far apart, it is likely the telephone number is in the active call database due to a different, earlier call request. A duration of no more than 1-2 seconds to account for any excessive network latency in receiving and processing the messages into and out of the active call database 120 should suffice. The duration, however, may be manipulated without departing from the cope or functionality of the present invention.

In step 245, the inbound carrier 130 receives the results of the query made in step 235. The results are analyzed in decision block 250. If the result is "fail", the inbound carrier does not route the call request to the called endpoint 135 at step 255. If the result is "pass", the inbound carrier does route the call request to the called endpoint 135 at step 260. At this point, it is up to the called endpoint whether to 'answer' the call or not. If the call is not answered, the termination service provider 110 will send a "not in use" message for the telephone number in the caller ID field to the active call database 120. The active call database 120 will then erase the record for that telephone number in the active call database to reflect the fact that the telephone number is currently not in use. If the called endpoint does answer the call, the calling endpoint telephone number will remain in the active call database 120 for the duration of the call. Once the call is completed, the termination service provider 110 will send a "not in use" message for the telephone number in the caller ID field to the active call database 120. The active call database 120 will then erase the record for that telephone number in the active call database to reflect the fact that the telephone number is currently not in use at step 265.

Figure 3:
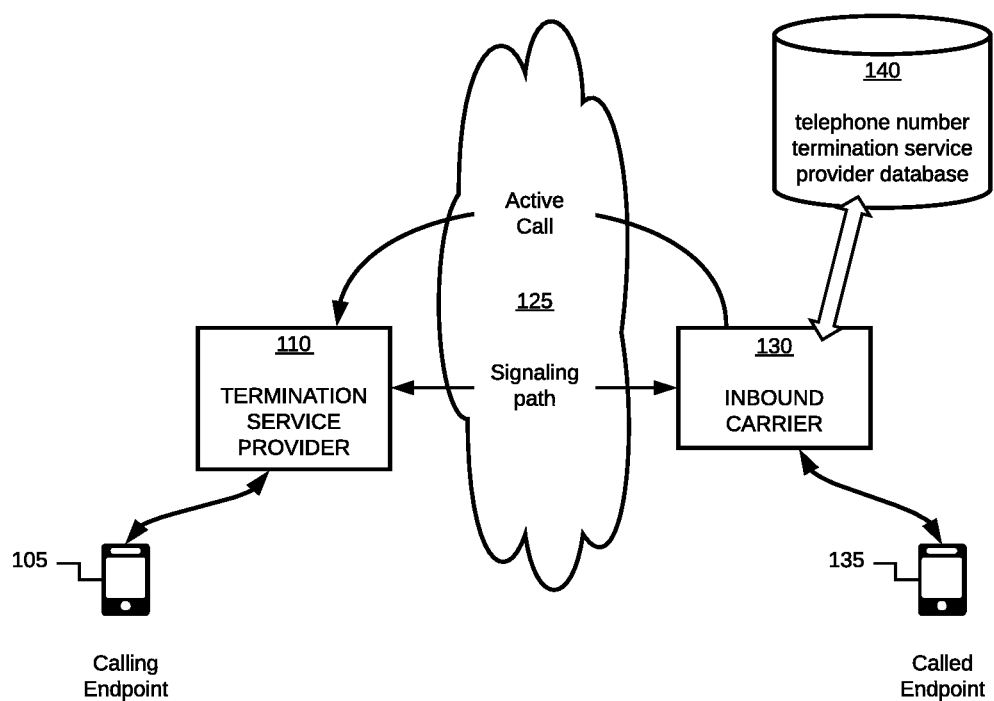
FIG. 3 illustrates another system architecture according to an embodiment of the invention.

FIG. 3 illustrates another system architecture according to an embodiment of the invention. FIG. 3 traces an outbound call from a calling endpoint 105 to the termination service provider 110 through one or more first networks 125 over to an inbound carrier 130 and finally to the called endpoint 135. As before, the calling and called endpoints may be landline telephones, VoIP telephones, mobile telephones, computer softphones, or the like. Each endpoint may be associated with a telephone number maintained by the telephony carrier that services the endpoint. The telephony carrier may be either the outbound carrier or the inbound carrier depending on the which endpoint the telephony carrier services. In some cases, the telephony carrier may be both the outbound carrier and the inbound carrier if the calling and called endpoints are both serviced by the same telephony carrier.

Each time a call is attempted, the calling endpoint 105 dials the number of the called endpoint 135. The caller ID field for the call record is normally populated with the telephone number associated with the calling endpoint 105. The termination service provider 110 serving the calling endpoint 105 receives and processes the call request routing the call request to the inbound carrier 130. The inbound carrier 130 receives the call request that includes a telephone number in the caller ID field that is supposed to properly identify the calling endpoint. Before forwarding the call request to the called endpoint, the inbound carrier 130 can verify the caller ID telephone number does indeed correspond to the calling endpoint 105 attempting to place the call. Verification may comprise the inbound carrier 130 first determining the termination service provider 110 for the telephone number in the caller ID field. The inbound carrier 130 may then send a signal back to the termination service provider 110 over a signaling channel. The signal may simply include the telephone number obtained from the caller ID field of the call request. There are two possible signal responses, pass or fail. If the termination service provider 110 can't confirm that telephone number just initiated a call, a fail signal will be returned. On the other hand, if the termination service provider 110 can confirm that telephone number just initiated a call, a pass signal will be returned.

FIG. 4 is another logic flow diagram describing a process 400 for verifying the caller ID field of an outbound telephone call according to an embodiment of the invention. The verification process begins when an outbound call request from a calling endpoint 105 is sent to the termination service provider 110 servicing that calling endpoint 105 at step 405. The outbound call request includes the telephone number of the called endpoint 135 and the telephone number of the calling endpoint 105 embedded in the caller ID field of the call request.

The termination service provider 110 receives the call request from the calling endpoint 105 at step 410 and determines the telephone number in the Caller ID field. The termination service provider 110 then routes the original call request to the appropriate inbound carrier 130 based on the called endpoint telephone number in the call request at step 415.

The inbound carrier 130 receives the call request at step 420. Prior to routing the call request to the called endpoint 135, the inbound carrier 130 queries a termination service provider database 140 to determine the termination service provider 110 for the telephone number in the caller ID field at step 425. The inbound carrier 130 may then send a signal back to the termination service provider 110 over a signaling channel comprised of the telephone number obtained from the caller ID field of the call request back to the termination service provider 110 at step 430. The termination service provider 110 then determines if it just initiated a call request using that telephone number at step 435. If the termination service provider 110 does not confirm the call request, a fail signal will be returned to inbound carrier 130 at step 440 and the inbound carrier 130 will not route the call request to the called endpoint 135 at step 450. If the outbound carrier confirms the call request, a pass signal will be returned to inbound carrier 130 at step 440 and the inbound carrier 130 will route the call request to the called endpoint 135 at step 455.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of verifying a caller ID field of an outbound telephone call, the method comprising:
   receiving a query from an inbound carrier call server in a termination service provider call server, the query including a caller ID telephone number associated with the outbound telephone call received by the inbound carrier call server where the outbound telephone call identified the termination service provider call server as the source of the outbound telephone call;
   determining whether the caller ID telephone number in the received query is currently in use;
   if the caller ID telephone number is not currently in use, returning a fail message to the inbound carrier call server;
   if the caller ID telephone number is currently in use and has been for greater than a predetermined amount of time, returning a fail message to the inbound carrier call server; and
   if the caller ID telephone number is currently in use and has been for less than the predetermined amount of time, returning a pass message to the inbound carrier call server.

2. The method of claim 1, the predetermined amount of time equal to two seconds.

3. The method of claim 1, the predetermined amount of time equal to three seconds.

4. The method of claim 1, the predetermined amount of time equal to five seconds.

5. A system configured to verify a caller ID field of an outbound telephone call, comprising a termination service provider call server, the termination service provider call server comprising one or more processors configured to execute instructions to:
   receive a query from an inbound carrier call server, the query including a caller ID telephone number associated with the outbound telephone call received by the inbound carrier call server where the outbound telephone call identified the termination service provider call server as the source of the outbound telephone call;
   determine whether the caller ID telephone number in the received query is currently in use;
   if the caller ID telephone number is not currently in use, return a fail message to the inbound carrier call server;
   if the caller ID telephone number is currently in use and has been for greater than a predetermined amount of time, return a fail message to the inbound carrier call server; and
   if the caller ID telephone number is currently in use and has been for less than the predetermined amount of time, return a pass message to the inbound carrier call server.

6. The system of claim 5, the predetermined amount of time equal to two seconds.

7. The system of claim 5, the predetermined amount of time equal to three seconds.

8. The system of claim 5, the predetermined amount of time equal to five seconds.

9. A non-transitory computer-readable medium comprising a plurality of instructions executable in a termination service provider call server that when executed enable processing circuitry to execute instructions to verify a caller ID field of an outbound telephone call, the instructions to:
   receive a query from an inbound carrier call server, the query including a caller ID telephone number associated with the outbound telephone call received by the inbound carrier call server where the outbound telephone call identified the termination service provider call server as the source of the outbound telephone call;
   determine whether the caller ID telephone number in the received query is currently in use;
   if the caller ID telephone number is not currently in use, return a fail message to the inbound carrier call server;
   if the caller ID telephone number is currently in use and has been for greater than a predetermined amount of time, return a fail message to the inbound carrier call server; and
   if the caller ID telephone number is currently in use and has been for less than the predetermined amount of time, return a pass message to the inbound carrier call server.

10. The non-transitory computer-readable medium of claim 9, the predetermined amount of time equal to two seconds.

11. The non-transitory computer-readable medium of claim 9, the predetermined amount of time equal to three seconds.

12. The non-transitory computer-readable medium of claim 9, the predetermined amount of time equal to five seconds.

* * * * *